United States Patent [19]

Wade

[11] Patent Number: 4,783,259

[45] Date of Patent: Nov. 8, 1988

[54] HELICAL COIL FILTER ELEMENT

[76] Inventor: Charles E. Wade, 22807 Chardonnay Diamond Dr. #1, Ontario, Calif. 91765

[21] Appl. No.: 882,400

[22] Filed: Jul. 7, 1986

[51] Int. Cl.$^4$ ............................................. B01D 29/48
[52] U.S. Cl. .................................. 210/169; 210/238; 210/350; 210/388; 210/442; 210/497.1; 55/477; 55/529
[58] Field of Search ............... 210/169, 232, 238, 350, 210/354, 356, 357, 388, 416.2, 441, 442, 453, 454, 497.1, 505; 55/477, 529, DIG. 44

[56] References Cited

U.S. PATENT DOCUMENTS

| | | | |
|---|---|---|---|
| 2,429,417 | 10/1947 | Magill | 210/356 |
| 2,460,084 | 1/1949 | Hebo | 210/356 |
| 2,468,354 | 4/1949 | Abbrecht | 55/477 |
| 2,838,131 | 6/1958 | Peterson | 55/477 |
| 3,527,351 | 9/1970 | Wade | 210/356 |
| 3,538,657 | 11/1970 | Macrow | 55/477 |

Primary Examiner—Richard V. Fisher
Assistant Examiner—Wanda L. Millard
Attorney, Agent, or Firm—Boniard I. Brown

[57] ABSTRACT

A fluid filter having a deformable filter body containing a myriad of filter passageways which may be enlarged to clean the filter by deforming the body. The presently preferred filter embodiment has a fluid permeable filter mass comprising a compact mass of pliant filter elements, such as pliant strands or strips, extending radially outward from the turns of an elastically deformable helix which has a normal axially contracted configuration wherein the helix forms an outlet passage extending longitudinally through the helix and communicating with a myriad of filter passageways extending through the filter mass and which helix is axially stretchable to enlarge the filter passageways for cleaning. A filter assembly including a filter tank containing the deformable fluid filter and having a removable cover for accessing the filter for cleaning.

5 Claims, 2 Drawing Sheets

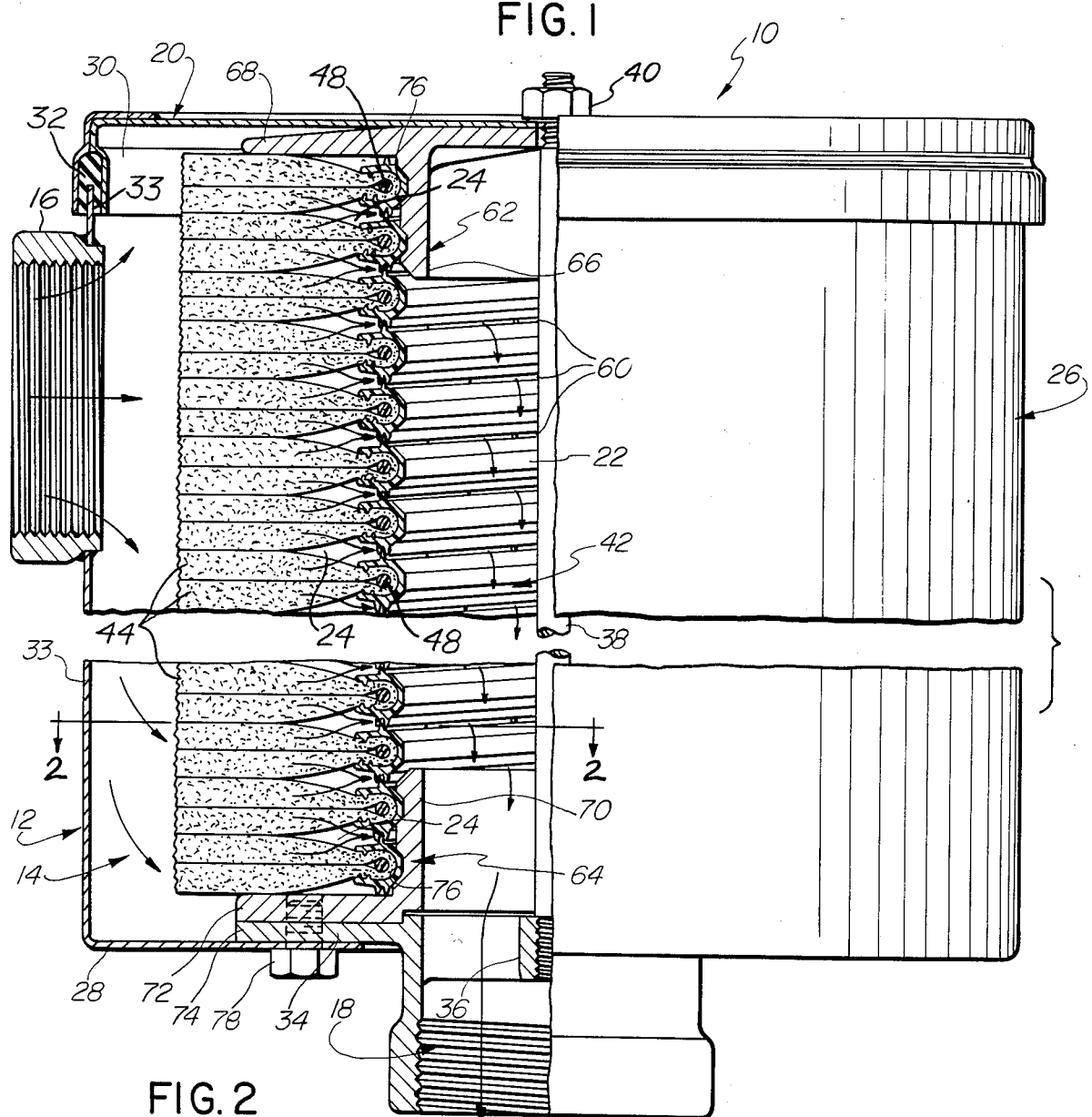
FIG. 1
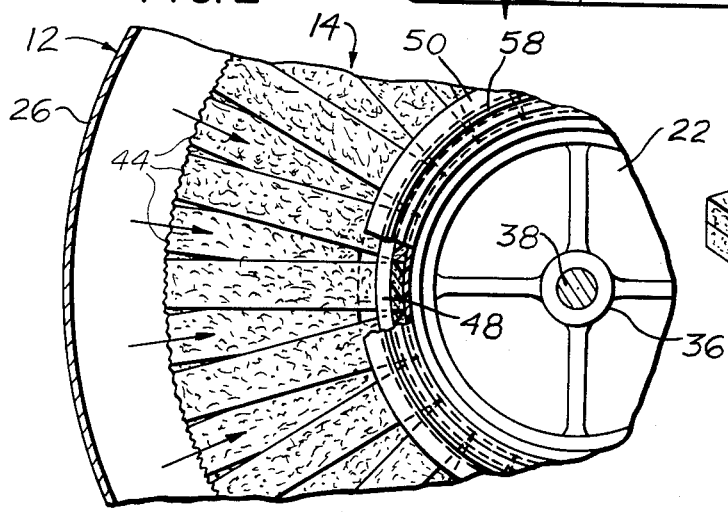
FIG. 2
FIG. 3

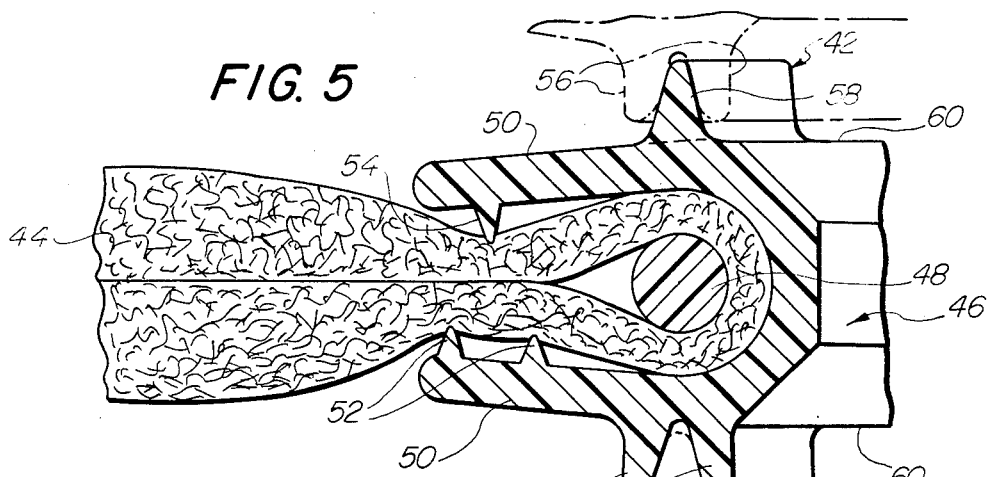
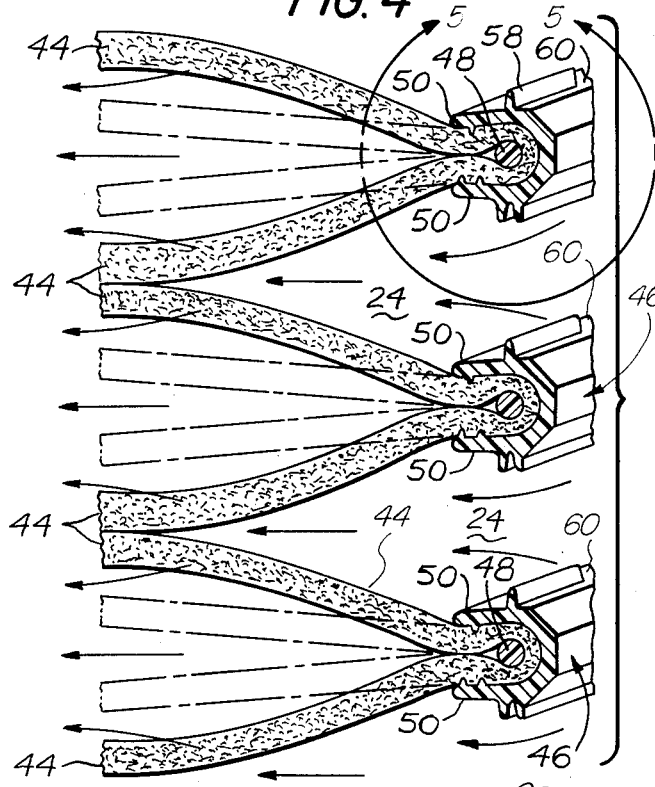
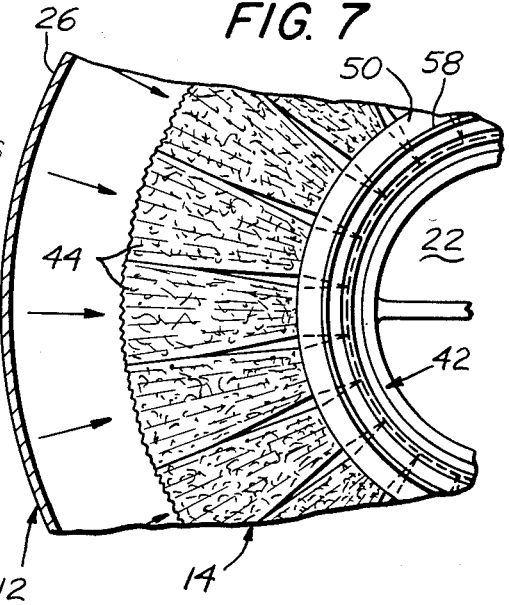
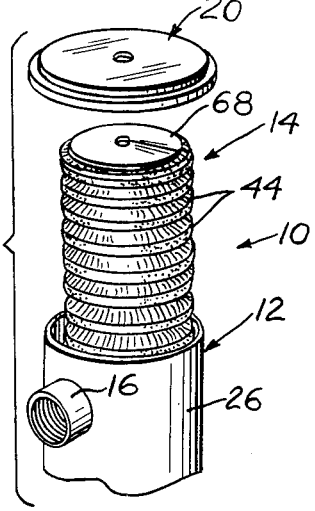
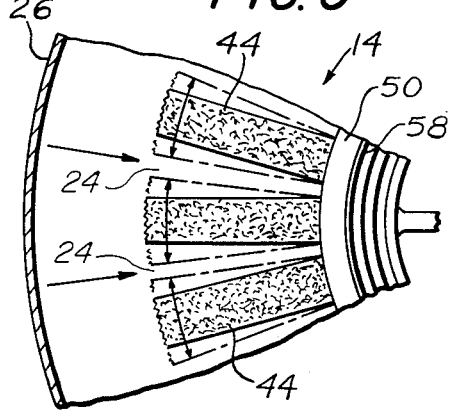

HELICAL COIL FILTER ELEMENT

BACKGROUND OF THE INVENTION

1. Field of the Invention

This invention relates generally to the art of fluid filtration and more particularly to a novel fluid filter and filter cleaning method.

2. Discussion of the Prior Art

As will become evident from the ensuring description, the principles of this invention may be utilized in fluid filters for a wide variety of fluid filtration purposes. The invention, however, is particularly concerned with filtering swimming pool water and for this reason will be described, but without limitation, in the swimming pool context. In this regard, important advantages of the filter are ease of cleaning, simplicity of construction, low cost, elimination of particulate filter aid.

The reasons for filtering swimming pool water are well known and need not be treated in detail here. Suffice it to say that the water in swimming pools tends to accumulate foreign matter owing to the nature of swimming pool use, the normal outdoor location of swimming pools, and the inherent tendency of swimming pool water to support the growth of algae and bacteria. Typical examples of foreign matter which tend to accumulate in the water of swimming pools are dust, dirt, leaves, and the like; oils such as hair oils and suntan lotion; algae; gelatinous materials resulting from the interaction of chemicals of various sorts which are used to treat pool waters; and insoluable salt products resulting from the chemical reaction between the chlorine and other reactive materials employed to treat the water. For reasons of health, safety and appearance, it is essential to minimize such water pollutants. This is generally accomplished by mechanical filtration. Such mechanical filtration generally involves the passage of the swimming pool water through a filtering medium such as sand or a porous element coated with diatomaceous earth or other expendible filter aid.

The prior art is replete with a vast assortment of fluid filters for filtering swimming pool water and a wide variety of other fluid filtering applications. Examples of such filters are described in the following patents: U.S. Pat. Nos. 3,202,284 and 2,468,354.

While these and other existing filters are satisfactory to some degree, cleaning the filters always presents a problem. A major problem common to all swimming pool filters, for example, resides in the fact that the foreign matter entrained in the pool water passing through the filters tends to form a cake on the upstream surface of the filtering medium. This cake gradually increases in thickness and density, and, as a consequence, presents increasing resistance to water flow through the filter. Frequent servicing of the filters, as by backwashing, spinning the filter element, or otherwise removing the cake of foreign matter, is necessary to periodically restore the filters to their proper operating condition. In those filters which utilize a coating of diatomaceous earth or other filter aid on a porous filter element, periodic servicing of the filters also requires recoating of the element with fresh filter aid which tends to be somewhat difficult and costly. Other filter cleaning problems could be discussed, such as disposing of used filter aid. Suffice it to say, however, that there is a definite need for an improved, more easily and conveniently cleanable filter. The present invention provides such an improved filter.

SUMMARY OF THE INVENTION

One aspect of the invention is concerned with a filter assembly including a tank having a fluid inlet and outlet and a filter within the tank containing a myriad of fluid filtering passageways through which fluid flow occurs from the inlet to the outlet. Another aspect of the invention is concerned with the filter which is deformable to enlarge the filter passageways for cleaning the filter. The filter tank has a closure which is readily removable to access the filter for cleaning.

A presently preferred and best mode embodiment of the filter has a generally helical and elastically deformable body having a normally axially contracted configuration in which the body defines an axial outlet passage through the body and a mass of pliant filter elements, such as strands or strips, extending generally radially out from the turns of the helical body. These filter elements form a compact filter mass about the body containing a myriad of interstitial filter passageways opening to the central outlet passage in the helical body. The filter is installed in the filter tank with this filter outlet passage opening to the tank outlet and with the tank inlet opening to the tank interior externally of the filter. Fluid flow thus occurs from the tank inlet, through the filter passageways, into the central filter outlet passage and then through the latter to the tank outlet.

The filter is cleaned by opening the filter tank cover to access the filter in the tank. The filter is then stretched lengthwise or otherwise deformed to separate the turns or coils of the filter and thereby enlarge the filter passageways for cleaning. A feature of this preferred embodiment resides in the fact that the filter tank outlet and tank cover are threadedly coupled to opposite ends of the filter in such a way that the filter may be stretched for cleaning without separating it from the tank by removing the tank cover and pulling the latter away from the tank. This action stretches the filter and pulls a major portion of the filter from the tank to expose the filter for cleaning with a hose or the like.

BRIEF DESCRIPTION OF THE DRAWINGS

FIG. 1 is a side elevation, partly in section of an improved filter assembly according to the invention;

FIG. 2 is a section taken on line 2—2 in FIG. 1;

FIG. 3 is an enlarged perspective view of one filter element of the improved filter embodied in the filter assembly;

FIG. 4 is an enlarged fragmentary view of the improved filter in its expanded or stretched cleaning configuration;

FIG. 5 is an enlargement of the area 5—5 in FIG. 4;

FIG. 6 is a view similar to FIG. 2 showing certain actions which occur in a relatively clean filter during normal filtering operation;

FIG. 7 is a view similar to FIGS. 2 and 6 showing certain flow restricting actions which occur in the filter when the filter passageways start to clog; and FIG. 8 illustrates the tank of FIGS. 1 and 5 with the cover pulled upwardly and the filter in its expanded or stretched configuration with a major length of the filter extended from the tank.

DETAILED DESCRIPTION OF THE INVENTION

The drawing illustrates an improved filter assembly 10 according to the invention. This filter assembly has two basic components which are an outer filter tank 12 and an inner filter 14 within the tank. Tank 12 has an inlet 16, an outlet 18, and a cover 20 which can be opened or removed. Filter 14 has a generally tubular body 42 containing and circumferentially surrounding a central longitudinal outlet flow passage 22 and a myriad of filter passageways 24 extending from the outer circumference of the filter through the filter body 42 to the outlet passage 22. According to an important feature of the invention, the filter is deformable or axially extendable to enlarge the filter passageways 24 for cleaning.

Filter 14 is installed in the filter tank 12 with the tank inlet 16 opening to the tank interior about the outside of the filter and with the central filter outlet passage 22 opening to the tank outlet 18. During filter operation, water or other fluid to be filtered enters the filter tank 12 through its inlet 16 and flows inwardly through the filter passages 24 to the central filter outlet passage 22. The fluid then flows through the latter passage to the tank outlet 18. As explained later, the filter passageways 24 filter foreign matter and substances from the fluid.

Filter 14 must be cleaned periodically to remove collected debris on and in the filter which clogs the filter passageways 24. Cleaning is accomplished by opening or removing the filter tank cover 20 to access the filter. The filter is then deformed to enlarge the passageways 24, and the filter is hosed off or otherwise treated with water or other suitable cleaning fluid to clean the filter and unblock the filter passageways. As will be seen, this cleaning may be performed without separating the filter from the filter tank 12.

Referring now in more detail to the drawings, the filter tank 12 is conventional except for certain features mentioned later involving the mounting of filter 14 in the tank. Tank 12 has a cylindrical body 26 closed at its normally lower end by an integral end wall 28. The opposite upper end of the tank body is open. This open end of the tank is closed by the cover 20 which is removable cover and has a peripheral channel 30 containing a seal ring 32. This seal ring is slotted to receive the upper edge of the tank side wall 33.

Tank inlet 16 is an internally threaded sleeve welded or otherwise fixed within an opening in the tank side wall 33. Tank outlet 18 is an internally threaded sleeve with an external flange 34 within and bolted to the bottom wall 28 of the tank 12. This outlet sleeve is coaxial with the tank and projects through a central opening in the bottom wall.

Spanning the outlet 18 is a spider 36. Tank cover 20 is releasibly secured to the tank body 20 by a spindle 38 threaded at one end in the spider 36. The other end of the spindle extends through the cover 20 and carries a threaded nut 40 for releasibly securing the cover on the tank body 26.

The illustrated filter 14 is the presently preferred filter of the invention. This filter has a tubular elastically deformable, axially extendable and contractable body 42 in the shape of a helix. The body tends to assume its normal contracted helical configuration of FIG. 1 wherein the adjacent turns or coils of the helix are disposed in side by side contact, as shown and described shortly. Extending generally radially outward from the body 42 at positions spaced generally uniformly about each coil of the helix are pliant strip-like filter elements 44. The manner in which these filter elements are secured to the filter body will be explained presently.

Extending axially through the filter body 42 is the filter outlet passageway 22. The filter elements 44 form therebetween the interstitial filter passageways 24 through which fluid flow occurs from the tank inlet 16 to the tank outlet 18.

The filter body 42 includes an elastically flexible helix 46 consisting of helically coiled elastic channel containing a helically coiled elastic rod 48. The helix channel has a radially outer side opening bounded by opposing side walls 50. Projecting from the inner confronting surfaces of these walls are tapered helical ribs including a pair of ribs 52 on one wall and a single rib 54 on the other rib aligned axially of the helix with the space between the rib pair 54.

Projecting from the normally lower side of the helix channel 46 are a pair of tapered helical ribs 56. Projecting from the normally upper side of the channel is a single tapered helical rib 58. Rib 58 is aligned axially of the helix with the space between the lower rib pair 56. Ribs 52, 54, 56 and 58 are coextensive and coaxial with the helix 46.

The illustrated filter elements 44 of the filter 14 are pliant strips, although they may be strands. These filter elements may comprise foam rubber or plastic, or woven or fibrous material. They are preferably porous. Each filter strip 44 is folded in half lengthwise and has its fold inserted into the filter helix channel 46 through its open outer side. The channel walls 50 are resiliently flexible and have normal spacing such that the walls must be spread to insert the filter strip folds into the body strip. When released, the walls spring toward one another to grip the filter strips between the walls. The helical ribs 52, 54 on the walls bite into the filter strips to provide firm gripping engagement of the walls with the filter strips. The helical rod 48 extends through the folds in the filter strips 44 to firmly anchor the filter strips to the filter helix channel 46.

The filter strips 44 are arranged side by side along the helix 46 with their inner folded ends in contact or close contiguous relation. The outer ends of the filter strips extend radially outward from the helix, initially in the spaced, fanned relation shown in FIG. 6. The adjacent strips defined therebetween the filter passageways 24. These passageways are tapered and narrow in the radial inward direction of fluid flow through the passages.

As noted earlier, the filter body 42 is elastically deformable and is stressed to normally assume its contracted helical configuration of FIG. 1, wherein the adjacent turns or coils of the helix 46 are disposed side by side in contact with or in close proximity to one another. In this normal contracted helical configuration, the upper rib 58 on each helix coil engages between the lower rib pair 56 on the adjacent coil, as shown in FIG. 1 and in FIG. 5, so as to retain the adjacent coils in axial alignment. The ribs 58 are notched or interrupted at intervals to form a myriad of radial ports or passages 60 through the filter body which constitute portions of the filter passageways 24 that extend through the filer from its outer circumference to the central filter outlet passage 22.

The filter body 42 may be provided with the required elasticity in various ways to assume its normal contracted helical configuration. Preferably both the helix channel 46 and retaining rod 48 are elastically deformable for this purpose. The helix channel may comprise a suitable plastic material and the retaining rod may comprise a helical metal spring.

As noted earlier, the filter 14 is coaxially mounted within the filter tank 12 with the central filter outlet passage 22 in communication with the tank outlet 18. The filter may be mounted in the tank in various ways. The preferred filter mounting means comprises generally tubular fittings 62 and 64 coaxially secured to the filter tank cover 20 and bottom end wall 28, respectively. The upper fitting 62 has a coaxial sleeve portion 66 and a flange 68 about the upper end of the sleeve seating against the cover. The lower fitting 64 has a coaxial sleeve portion 70 and a flange 72 about the lower end of the sleeve. The lower fitting flange 72 seats on an inner flange 74 of the tank outlet 18. The lower fitting and tank outlet are secured by bolts 78 to the bottom filter tank wall 28. The central opening through the lower fitting sleeve 70 opens upwardly to the central filter outlet passage 22 and downwardly to the tank outlet 18 to communicate the passage to the outlet.

The fitting sleeves 66, 70 are externally sized and helically grooved at 76 to receive is essentially threaded relation the ends of the filter body helix 46. The filter 14 is thereby releasibly coupled to the filter tank outlet 18 and cover 20.

The filter assembly 10 illustrated is intended for use in a swimming pool filter system. The filter assembly is installed in the usual way with the filter tank inlet 16 connected to the outlet of the filter pump (not shown) and the tank outlet 18 connected to the water return line (not shown) to the swimming pool. Accordingly, water from the swimming pool enters the filter tank 12 on the outside of the filter 14 and flows radially inward through the filter passageways 24 to the central filter outlet passage 22. The filtered water flows downwardly through the outlet passage to the filter tank outlet 18 and then back to the swimming pool.

As the water flows through the filter passageways 24, the motion of the water varying water pressure cause the filter elements 44 to wriggle back and forth as shown in broken and solid lines in FIG. 6. This wriggling motion tends to constantly disturb the debris which collects on the filter and thereby keep the filter passageways open. As the passageways become clogged over a period of use, the water pressure tends to build up on the outside of the filter 14 and to compress the filter elements 44 together, as shown in FIG. 7.

The filter 14 must be periodically cleaned to restore its filtering efficiency. This is accomplished by removing the filter tank cover retention nut 40 and pulling the filter tank cover 20 upwardly from the filter tank 12. This action stretches the filter 14 and pulls a major length of the filter axially from the tank so that it may be hosed off. Stretching the filter separates the coils of its tubular body 42 and thereby the filter elements 44 on adjacent coils to enlarge the filter passageways 24. The filter may thus be effectively cleaned by hosing off the stretched filter. The water stream may be directed outwardly through the filter passageways, as depicted by the arrows in FIG. 4 to optimize the cleaning action.

Pulling of the filter 14 from the filter tank 12 and resultant stretching of the filter creates elastic strain energy forces in the filter tending to restore or contract the filter to its normal filtering configuration of FIG. 1. Accordingly, the filter returns to its normal contracted configuration of FIG. 1 as the cover 20 is returned to its closed position on the tank 12.

The inventor claims:
1. A fluid filter comprising:
a helically coiled member forming an axially expandable and contractable helix,
said member having a first side facing in one axial direction of the helix and a second side facing in the opposite axial direction of the helix, a first pair of coaxial ribs substantially coextensive with and projecting axially of the helix from said first side of said member, and a single coaxial rib substantially coextensive with and projecting axially of the helix from said second side of said member,
said helix having a normal contracted configuration wherein the adjacent helix coils abut one another with the single rib along each helix coil engaging between the rib pair along an adjacent helix coil to retain the helix coils in coaxial alignment wherein the helix forms a tubular body containing an axial flow passage,
the ribs being interengaging on the adjacent helix coils and having aligned notches at intervals therealong forming a multiplicity of openings communicating said axial flow passage to the exterior of the helix,
filter elements secured to said member and extending outwardly from said helix to form a myriad of filter passages communicating with said openings, and wherein
said helix is axially expandable to separate the adjacent helix coils and the filter elements thereon for backwashing the filter.
2. A fluid filter according to claim 1, wherein:
said filter elements comprise strips of pliant material taken from the group consisting of a woven, foam and fibrous material.
3. A filter assembly comprising:
a tank including a hollow body having one end closed by a tank end wall and an opposite open end, a removable cover closing said open end, and means releasably securing said cover to said body,
a filter within said tank comprising a helically coiled member forming an axially expandable and contractable helix extending between said tank end wall and cover, and filter elements secured to said member and extending radially out from said helix to form a myriad of filter passageways between the elements communicating the interior of said tank about said filter to the interior of said helix through a multiplicity of openings between adjacent coils of the helix,
said tank having an inlet communicating to the tank interior about said filter and an outlet communicating to the interior of said helix at one end thereof, and
means securing the ends of said helix to said tank end wall and cover, respectively, whereby said helix has a normal axially contracted configuration when said cover is in place on said tank body and said helix is axially expandable by axial removal of said cover from said tank body to separate the adjacent helix coils and thereby enlarge said openings for backwashing the filter.
4. A filter assembly according to claim 3, wherein:
said member has a first side facing in one axial direction of the helix and a second side facing in the opposite side of the helix, a first pair of coaxial ribs substantially coextensive with and projecting axially over the helix from said first side of said member and a single coaxial rib substantially coextensive with and projecting axially of the helix from said second side of said member, the single rib along each helix coil engages between the rib pair along an adjacent coil to retain the helix coils in coaxial alignment when the helix is contracted, and the ribs being interengaging and having aligned notches at intervals therealong forming said openings.

5. A fluid filter according to claim 4, wherein:
said filter elements comprise strips of pliant material taken from the group consisting of a woven, foam and fibrous material.

* * * * *